United States Patent [19]

Delavaux et al.

[11] Patent Number: 5,572,612
[45] Date of Patent: Nov. 5, 1996

[54] BIDIRECTIONAL OPTICAL TRANSMISSION SYSTEM

[75] Inventors: Jean-Marc P. Delavaux, Wescosville, Pa.; Philippe A. Perrier, Velizy Villa Coublay, France

[73] Assignee: Lucent Technologies Inc., Murray Hill, N.J.

[21] Appl. No.: 355,943

[22] Filed: Dec. 14, 1994

[51] Int. Cl.$^6$ .................................................... G02B 6/28
[52] U.S. Cl. ................................ 385/24; 385/46; 385/7; 359/119; 359/118
[58] Field of Search ................................ 385/24, 23, 3, 385/4, 7, 31, 46; 359/118, 119, 121, 127, 124

[56] References Cited

U.S. PATENT DOCUMENTS

| | | | |
|---|---|---|---|
| 5,140,655 | 8/1992 | Bergmann et al. | 385/46 |
| 5,214,728 | 5/1993 | Shigematsu et al. | 385/24 |
| 5,280,549 | 1/1994 | Barnard et al. | |
| 5,388,172 | 2/1995 | Anderson | 385/23 |

FOREIGN PATENT DOCUMENTS

| | | | |
|---|---|---|---|
| 0427586 | 5/1991 | European Pat. Off. | H04B 10/24 |
| 0474426 | 3/1992 | European Pat. Off. | G02B 5/28 |
| 0536041 | 4/1993 | European Pat. Off. | H04B 10/20 |

OTHER PUBLICATIONS

"Amplifying Fibre LAN's", Proceedings IEEE/LOS Optical Multi-Access Networks, paper PD2, Jul. 1990.

"Optical Ring Networks with Distributed Amplification", IEEE Photonics Technology Letters, vol. 3, No. 4, Apr. 1991, Evan Goldstein, pp. 390–393.

"A PON Architecture With Single Optical Carrier Bidirectional Transmissions", 4th Workshop on Optical Local Networks, Sep. 24 and 25, 1993, Versailles, France.

"Simultaneous Bit Rate Independent Bidirectional Data Transmission On A Single Optical Carrier For PON Applications", ECOC '92, Perrier et al., Berlin, Germany, Sep. 1992.

*Primary Examiner*—John D. Lee
*Assistant Examiner*—Phan T. H. Palmer
*Attorney, Agent, or Firm*—Richard D. Laumann

[57] ABSTRACT

Bidirectional transmission over a single optical fiber is obtained in an optical communications system by using a three port circulator in customer premises equipment together with an optical fiber amplifier and a narrow band filter. The fiber amplifier can be locally or remotely pumped. The acousto-optic modulator is advantageously used because it reduces the coherent Rayleigh noise by detuning upstream and downstream wavelengths.

7 Claims, 1 Drawing Sheet

BIDIRECTIONAL OPTICAL TRANSMISSION SYSTEM

TECHNICAL FIELD

This invention relates generally to optical transmission systems and particularly to such systems that transmit bidirectionally over a single optical fiber using a single wavelength as well as to the components of such systems.

BACKGROUND OF THE INVENTION

Communications systems using optical fibers have reached a state of great technical sophistication and are not only of great commercial importance at the present time but undoubtedly will continue to increase in importance. The most advanced systems at present have the capability of transmitting information at rates greater than 10 Gbit/sec over distances of hundreds of kilometers.

Present systems thus have tremendous capacity. However, further increases in capacity or configurations of transmitters, receivers, modulators, etc., that reduce the costs of systems or increase capacity are economically attractive. For example, early optical communications systems spanned long distances by using repeaters that periodically detected and regenerated the optical signal. Present day systems that span long distances use optical amplifiers which are cheaper than are repeaters. The commonly used optical amplifiers use a rare earth doped optical fiber. Erbium is widely used and erbium doped fiber amplifiers are frequently referred to by the acronym EDFA. The amplifiers use a laser as the source for the pump signals for the EDFA. The configuration or architecture of the optical communications system is also important with different configurations having different assets and liabilities. The star architecture is presently preferred for fiber amplifier systems because it can support a larger number of stations than can other architectures.

The star configuration may be either unidirectional or bidirectional. However, the star configuration suffers from a significant drawback; namely, a non-optically isolated EDFA produces amplified spontaneous emission(ASE) which degrades both the upstream and down stream sensitivities and may create system instabilities due to lasing caused by optical reflections. This drawback exists for both discrete and distributed gain elements.

There is an extensive literature that describes the prior art. See, for example, Bergmann, U.S. Pat. No. 5,140,655; Cassidy, Proceedings IEEE/LOS Optical Multi-Access Networks, paper PD2, July 1990; Goldstein, IEEE Photon. Technology Letters, pp. 390–393, April 1991; Perrier 4th Workshop on Optical Local Networks, Sep. 24–25, 1993, Versailles, France; Perrier, ECOC 92, pp. 289–292, Berlin, Germany, September 1992.

Other configurations, such as a ring or a Manhattan street architecture, are also of interest. It is desirable to have a distribution system in which a single channel may be received by many users.

SUMMARY OF THE INVENTION

According to an exemplary embodiment of the invention, optical apparatus has an optical circulator with at least three ports and a fiber amplifier connected to at least one port. Them is a modulator optically connected to both an optical circulator port and the fiber amplifier which receives and then modulates the upstream data. There is also a multiplexer coupler connected to the fiber amplifier and to an optical circulator port. A filter is used to select the carrier downstream wavelength and remove ASE power. The laser used to optically pump the fiber amplifier may be locally or remotely situated.

Yet another exemplary embodiment of the invention uses the apparatus described in an optical communications system having a central office having a star coupler connected to a plurality of channels and at least one pump laser. The star coupler and the apparatus are connected by an optical fiber.

DETAILED DESCRIPTION

Figure 1:
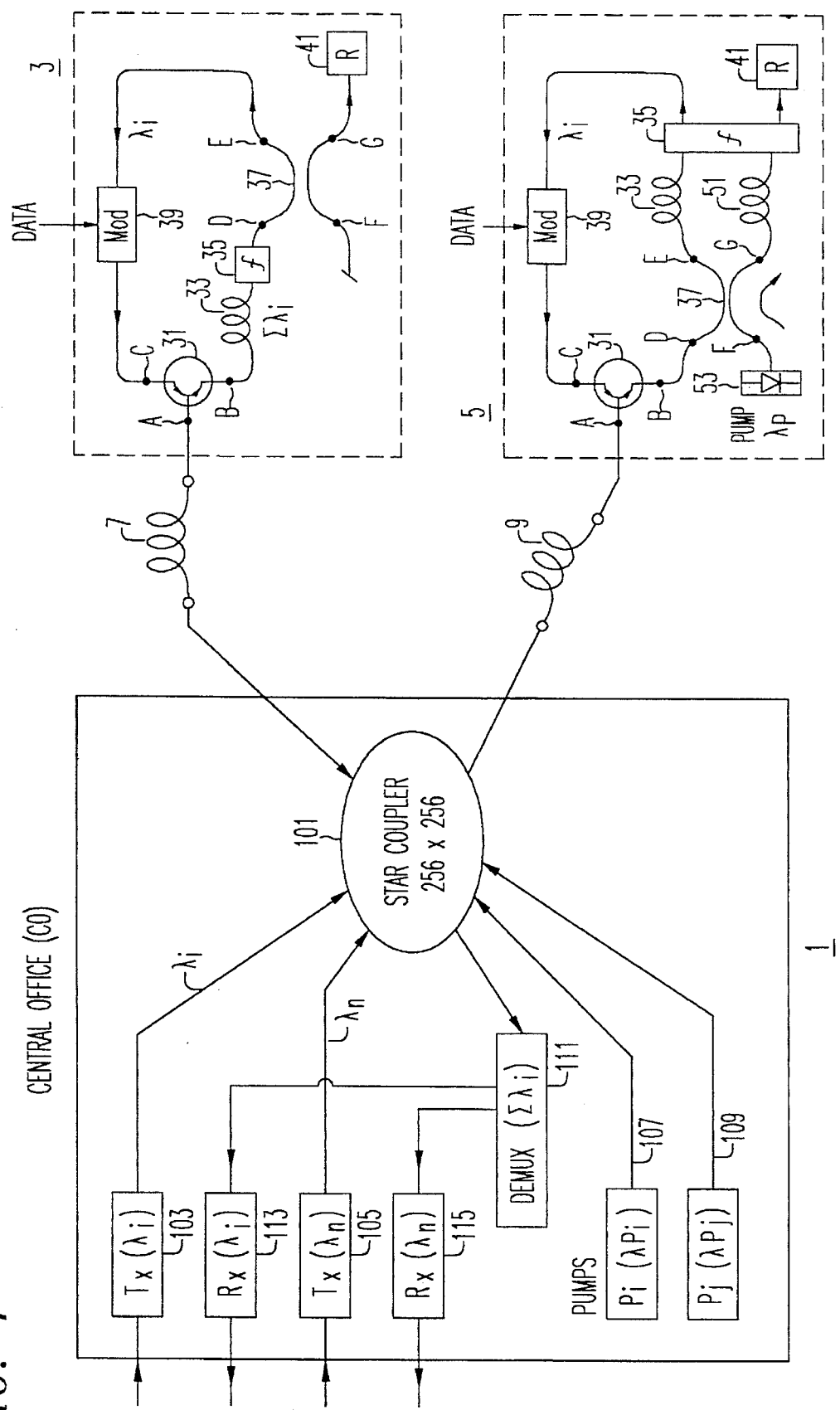
FIG. 1 depicts an exemplary optical communications system according to this invention and apparatus according to this invention used in the system.

The invention will be described by reference to the exemplary embodiment depicted in the FIGURE. Variations and other embodiments will be apparent to those skilled in the art after the exemplary embodiment is understood. Depicted are a central office (CO), indicated as 1, and apparatus, indicated as 3 and 5, used on customer premises. The central office 1 and apparatus 3 and 5 are optically connected by means of optical fibers 7 and 9, respectively.

The central office 1 has a star coupler 101 which has ports for receiving a plurality of signals from transmitters $T_x$ is shown as 103 and 105; and a plurality of signals from pumps $P_i$ is shown as 107 and 109. The star coupler depicted is 256×256; other sizes may also be used. The star coupler 101 also has ports for receiving the pump signals and sending the received signals to the demultiplexer 111. The demultiplexer 111 is connected to a plurality of receivers $R_x$ 113 and 115. The receivers, transmitters, and pumps may operate at different wavelengths as shown by the different subscripts attached to the $\lambda$s. The components depicted are well known to those skilled in the an and will be readily selected by those skilled in the art.

Apparatus 3 has an optical circulator 31 with three ports which are designated as A, B, and C; a fiber amplifier 33; a filter f 35; a multiplexer coupler 37 with tour ports designated as D,E,F and G; modulator Mod 39; and a receiver R 41. The fiber amplifier 33 is optically connected to two ports of the optical circulator 31. It is directly connected to port B and optically connected to port C through other components. The term "connected" is used to mean optically connected. Intermediate components may be present. "Directly connected" means intermediate components are not present. Filter 35 is connected to the fiber amplifier 33 and to port D of the multiplexer 37. The multiplexer 37 is also connected to the receiver 41 through port G, as well as the modulator 39 through port E. The modulator has a port for receiving the upstream data and is connected to port C of optical circulator 31. Port A of circulator 31 is connected to the filter going to the central office 1. The multiplexer 37 is also connected to a pump laser at port F; the laser is not depicted in this apparatus to emphasize that the pump laser may be either local or remote. The apparatus depicted will be readily fabricated by those skilled in the art after operation of the optical communication system is described.

The optical fibers 7 and 9 between the central office 1 and apparatus 3 and 5, respectively, are also well known and will be readily selected by those skilled in the art. As shown, the optical fibers are connected to ports on the star coupler and to port A on the optical circulators.

Apparatus 5 is generally similar to apparatus 3; however, it has an additional fiber amplifier 51 and pump laser 53, having a pump wavelength λp, is depicted. The configuration of the components differs somewhat from that of apparatus 3. Fiber amplifiers 33 and 51 are connected to ports F and G, respectively. The filter 35 is depicted as a single component, that is, a tandem filter, and is connected to the ends of fiber amplifiers 33 and 51 that are not connected to the multiplexer 37. Thus, filter 37 is effective for both channels.

Operation of the system and its components will now be described. The downstream signal from a transmitter is intensity modulated at the central office 1 with a small index while the carrier is fully ON/OFF modulated at apparatus 3 or 5 to generate the modulated upstream signal. A single frequency laser, such as a distributed feedback laser(DFB), may be used to provide the optical signal for the bidirectional system. At the central office, the downstream signal which has been produced by direct modulation of the transmitter is coupled into the optical fiber, for example, 7 or 9, through the star coupler which serves as a multiplexer. The multiplexer coupler permits mixing of the pump and modulated signal. These components are well known and are therefore not depicted. At apparatus 3, the signal enters the circulator at port A and is amplified by the fiber amplifier 31. After amplification, a portion of the signal is tapped off for detection by the receiver. Several per cent, for example, approximately 10 per cent, is an adequate amount to be tapped off for reception. The remaining portion of the signal is directed to the modulator, which is desirably polarization independent, which generates the modulated upstream signal. The upstream signal then enters port C of the circulator and exits from port A of the circulator and goes to the central office through fiber 7 where it is detected by a receiver after passing through the star coupler 101 and demultiplexer 111.

Both apparatus 3 and 5 have a narrow band filter 35 such as a Fabry-Perot filter, an acousto-optic SAW filter, or a LiNbO$_3$ device. The ASE near the signal is used and amplified for the upstream signal. This filter filters the carrier downstream wavelength. The modulator 39, for example, acousto-optic, desirably shifts the frequency of the modulated signal with respect to the unmodulated signal frequency and reduces the coherent Rayleigh coherent noise at the receiver. The frequency shift is to a region out of the filter. The upstream and downstream signals are at different frequencies although only a single laser is used as the radiation source. Although the frequencies differ, the system operates using a single wavelength light source.

Advantages of the apparatus and system, as compared to other apparatus and systems, are now apparent. Three advantages deserve explicit mention. First, the upstream and downstream signals are isolated and their transmission losses are reduced when compared to the standard star couplers. Second, the optical power budgets of both upstream and downstream signals are increased by using the gain of the fiber amplifier while preventing most of the ASE from degrading system performance. Third, remote pumping is permitted at the apparatus although local pumping at either 980 nm or 1480 nm may be used.

The modulator may be a polarization independent modulator, such as an acousto-optic modulator, LiNbO$_3$ modulator or any other modulator, as previously mentioned. Alternatively, a semiconductor optical amplifier may be used. The acousto-optic modulator is presently preferred for several reasons. First, it does not generate any ASE and should therefore reduce Rayleigh noise and signal-ASE beat noise at the receivers. Second, the previously mentioned inherent frequency shift of the acousto-optic modulator should result in optical isolation of the input downstream signal and the output upstream signal. Third, the acousto-optic modulator is capable of both amplitude and frequency modulation.

It will be appreciated that a single optical fiber is utilized for communication on a single channel between the central office and each apparatus. Both apparatus 3 and 5 utilize the fiber amplifier to obtain gain but also prevent most of the ASE from reaching the star coupler.

It has been observed that in bidirectional transmission using the same wavelength interference between the downstream and Rayleigh back-scattered upstream signal degrades the receiver sensitivity and restricts the transmission span length. We found that the sensitivity degradation increases with decreasing modulation index. Therefore, signal gain has to be weighed to obtain a compromise between transmission budget loss and an acceptable coherent Rayleigh noise level. Alternatively, the upstream signal wavelength may be detuned with respect to the downstream wavelength.

The locations described for both the filter and fiber amplifier are exemplary only and other locations may be used. For example, the fiber amplifier may be inside or outside the optical loop connecting ports B and C of the optical circulator. The location of the filter may be similarly varied. If it is located before the circulator, only the desired wavelengths are amplified.

Variations in the embodiment depicted will be readily though of by those skilled in the art. For example, a three port optical circulator could be used rather than the optical isolator and 3 dB coupler described with respect to the central office. Additionally, the configuration described uses a star coupler, but other configurations are contemplated. Furthermore, although the use of a three part optical circulator has been described, a four part optical circulator could be used.

We claim:

1. Apparatus comprising:

an optical circulator having at least three ports;

a fiber amplifier optically coupled to two of said ports;

a filter optically connected to at least one of said ports;

a modulator optically coupled to one of said ports and to said fiber amplifier, said modulator having a port for receiving data; and a multiplexer coupler optically connected to said fiber amplifier and to said modulator.

2. Apparatus as recited in claim 1 in which said modulator comprises an acousto-optic modulator.

3. Apparatus as recited in claim 1 further comprising a receiver, said receiver being optically connected to said multiplexer.

4. Apparatus as recited in claim 1 further comprising a pump laser, said pump laser being optically connected to said multiplexer coupler.

5. An optical communications system comprising:

a plurality of transmitters;

a coupler connected to said plurality of transmitters and to at least one pump laser;

an optical fiber, said optical fiber being connected to said coupler;

an optical circulator having at least three ports, one of said ports being connected to said optical fiber;

a fiber amplifier optically coupled to at least one of said ports;

a modulator optically coupled to one of said ports and to said fiber amplifier; and a multiplexer coupler optically connected to said fiber amplifier.

6. An optical communications system as recited in claim 5 further comprising a demultiplexer, said demultiplexer being optically connected to said coupler.

7. An optical communications system as recited in claim 6 further comprising a plurality of receivers, said receivers being optically connected to said coupler.

* * * * *